United States Patent
Carson et al.

(10) Patent No.: US 11,082,914 B2
(45) Date of Patent: Aug. 3, 2021

(54) TRANSIENT NETWORK COMMUNICATION

(71) Applicant: California Eastern Laboratories, Inc., Santa Clara, CA (US)

(72) Inventors: Robert Scott Carson, Boulder, CO (US); David Paul Peterson, Lake Villa, IL (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 248 days.

(21) Appl. No.: 16/422,083

(22) Filed: May 24, 2019

(65) Prior Publication Data
US 2020/0374790 A1 Nov. 26, 2020

(51) Int. Cl.
*H04W 48/18* (2009.01)

(52) U.S. Cl.
CPC .................... *H04W 48/18* (2013.01)

(58) Field of Classification Search
None
See application file for complete search history.

(56) References Cited

U.S. PATENT DOCUMENTS

| | | | | |
|---|---|---|---|---|
| 6,791,949 B1 * | 9/2004 | Ryu | ...................... | H04W 84/18 370/254 |
| 10,045,389 B2 * | 8/2018 | Kim | .................... | H04L 12/6418 |
| 2004/0133689 A1 * | 7/2004 | Vasisht | ............... | H04L 61/2061 709/228 |
| 2007/0206527 A1 * | 9/2007 | Lo | ....................... | H04L 63/0272 370/328 |
| 2013/0107703 A1 * | 5/2013 | Cherian | .............. | H04W 74/085 370/230 |
| 2013/0142118 A1 * | 6/2013 | Cherian | .................. | H04L 45/00 370/328 |
| 2013/0204717 A1 * | 8/2013 | Bookstaff | .............. | G06Q 10/00 705/14.73 |
| 2014/0075075 A1 * | 3/2014 | Morrill | ............. | H04M 1/72415 710/303 |
| 2014/0241266 A1 * | 8/2014 | Cherian | .............. | H04W 12/069 370/329 |
| 2014/0241267 A1 * | 8/2014 | Cherian | ................ | H04L 61/103 370/329 |
| 2015/0043377 A1 * | 2/2015 | Cholas | .................. | H04W 76/10 370/254 |

(Continued)

*Primary Examiner* — Phirin Sam
*Assistant Examiner* — Faiyazkhan Ghafoerkhan
(74) *Attorney, Agent, or Firm* — Richard W. James

(57) ABSTRACT

A user interface transient communication apparatus, method, and system. A user interface selects a communication path with a gateway without experiencing repeated failure. The user interface includes a network communication device for communicating with a remote device and a processor coupled to the network communication device. The processor includes instructions which, when executed by the processor, cause the processor to receive a system notification of a local area network on which the network communication device is communicating, communicate with a target gateway on the local area network through the network communication device if the target gateway is communicating on the local area network, and communicate with the target gateway through a wide area network through the network communication device if the target gateway is not communicating on the local area network.

19 Claims, 4 Drawing Sheets

(56) References Cited

U.S. PATENT DOCUMENTS

| | | | | |
|---|---|---|---|---|
| 2015/0048924 A1* | 2/2015 | Feldstein | ............... | G07C 9/27 |
| | | | | 340/5.51 |
| 2015/0163631 A1* | 6/2015 | Quam | ................... | H04W 4/021 |
| | | | | 455/456.1 |
| 2016/0080998 A1* | 3/2016 | Fukuta | ................ | H04W 36/14 |
| | | | | 370/331 |
| 2016/0165650 A1* | 6/2016 | Kim | ................... | H04L 12/6418 |
| | | | | 370/329 |
| 2017/0111755 A1* | 4/2017 | Cherian | ................. | H04L 45/00 |
| 2017/0238239 A1* | 8/2017 | Ong | ..................... | H04W 48/18 |
| | | | | 370/338 |

* cited by examiner

TRANSIENT NETWORK COMMUNICATION

BACKGROUND

Field of the Disclosure

The present disclosure generally relates to communication of a wireless device to a network controller on a local area network (LAN) or a wide area network (WAN) and, more particularly, to a user interface communicating locally or remotely with a gateway in a building control system.

Brief Description of Related Art

Computer automated control systems may be accessed by a device, such as a wireless user interface. To communicate, the wireless user interface may determine whether it is communicating on the local area network (LAN) the computer automated control system is operating on or whether the wireless device is remote from the control system LAN, in which case the wireless device may connect to the control system through a wide area network (WAN), such as the Internet.

A gateway is frequently included in such a wireless control system and may, to some degree, control operation and communications within the wireless control system.

Systems for determining whether a wireless device is within range of the control system LAN are often slow to respond to a user request, for example attempting to communicate on a nearby control system LAN that does not include control nodes or a gateway with which the user wishes to communicate repeatedly and failing to communicate repeatedly before switching to a WAN connection.

Thus there is a need for systems, apparatuses, and methods that efficiently determine whether a wireless device can connect directly to a control system LAN.

There is also a need for systems, apparatuses, and methods that efficiently switch a wireless device communicating with a device on a LAN between direct communication on that LAN and communication with that device on that LAN by way of a WAN.

SUMMARY OF THE INVENTION

In one embodiment, the present disclosure contemplates a user interface that selects a communication path with a gateway without experiencing repeated failure. The user interface includes a network communication device for communicating with a remote device and a processor coupled to the network communication device. The processor includes instructions which, when executed by the processor, cause the processor to receive a system notification of a local area network on which the network communication device is communicating, communicate with a target gateway on the local area network through the network communication device if the target gateway is communicating on the local area network, and communicate with the target gateway through a wide area network through the network communication device if the target gateway is not communicating on the local area network.

In another embodiment, the present disclosure contemplates a user interface that includes a network communication device for communicating with a remote device and a processor coupled to the network communication device. The processor includes instructions which, when executed by the processor, cause the processor to determine whether the user interface is in range of a local area network to which a target gateway is coupled when the processor receives a system notification that the network communication device is communicating with a network, communicate with the target gateway on the local area network through the network communication device if the user interface is in range of that local area network, and communicate with the target gateway through a wide area network through the network communication device if the user interface is not in range of that local area network.

In yet another embodiment, the present disclosure contemplates a method of determining whether a user interface should communicate with a target gateway through a local area network or through a wide area network. That method includes connecting to a local area network, receiving a system notification indicating the network to which the user interface has connected, determining whether a gateway with which the user interface is to communicate is connected to the network to which the user interface has connected, and communicating with the gateway through the local network if that gateway is connected to the local area network and communicating with the gateway through a wide area network if the gateway is not connected to the local area network.

BRIEF DESCRIPTION OF THE DRAWINGS

For the present disclosure to be easily understood and readily practiced, the present disclosure will now be described for purposes of illustration and not limitation, in connection with the following figures.

The accompanying drawings, wherein like reference numerals are employed to designate like components, are included to provide a further understanding of the present inventions, are incorporated in and constitute a part of this specification, and show embodiments of those apparatuses and methods that together with the description serve to explain those apparatuses and methods.

Figure 1:
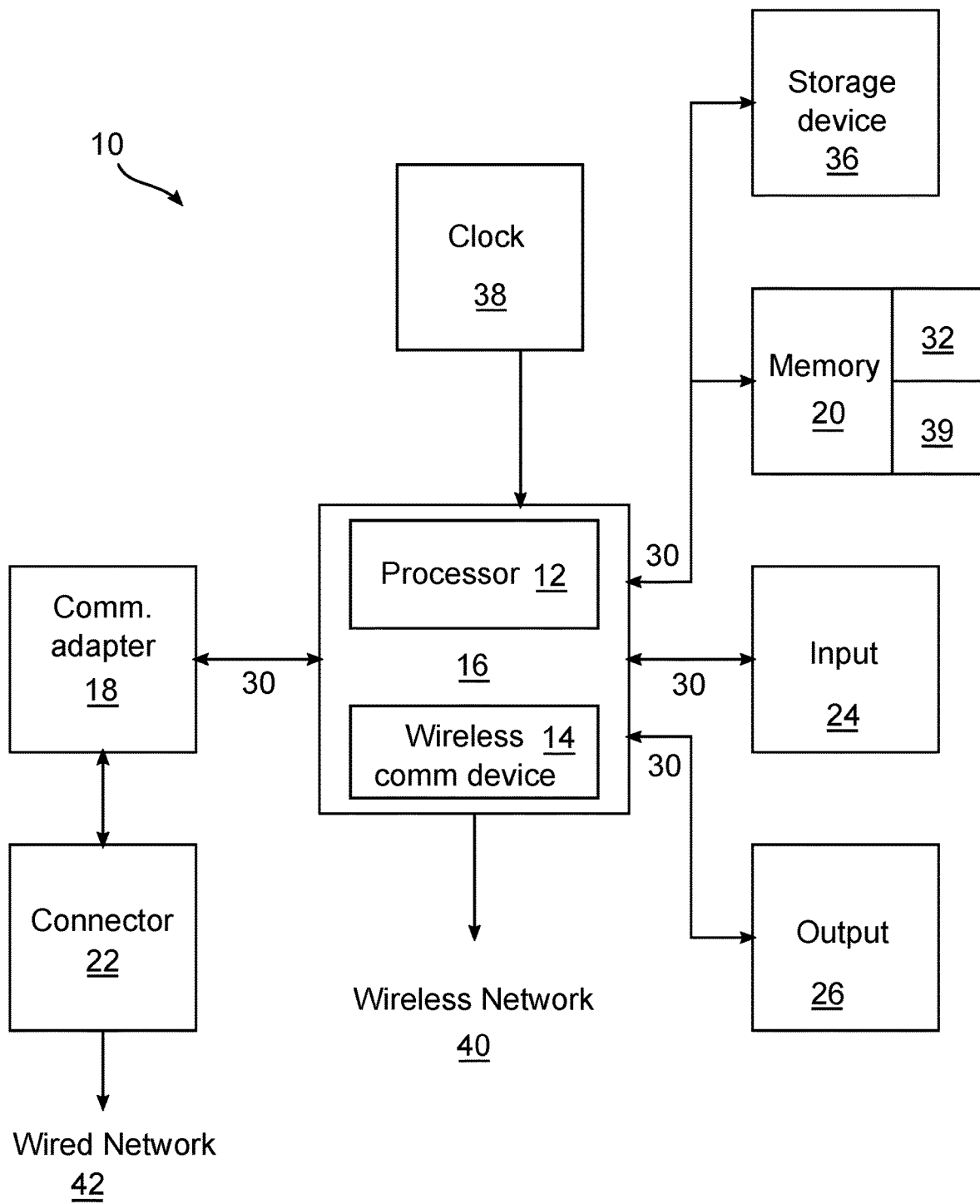
Figure 2:
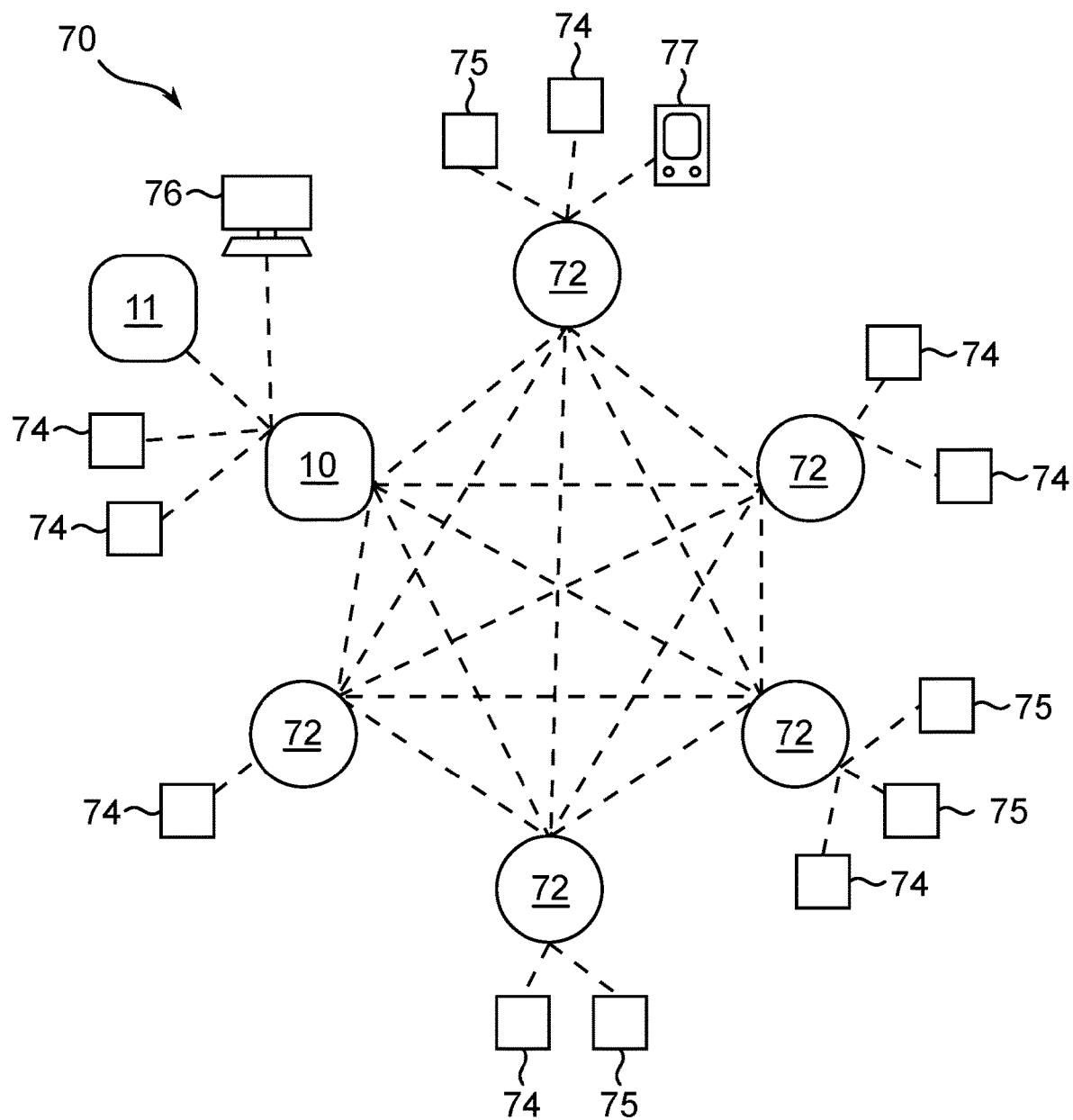
Figure 3:
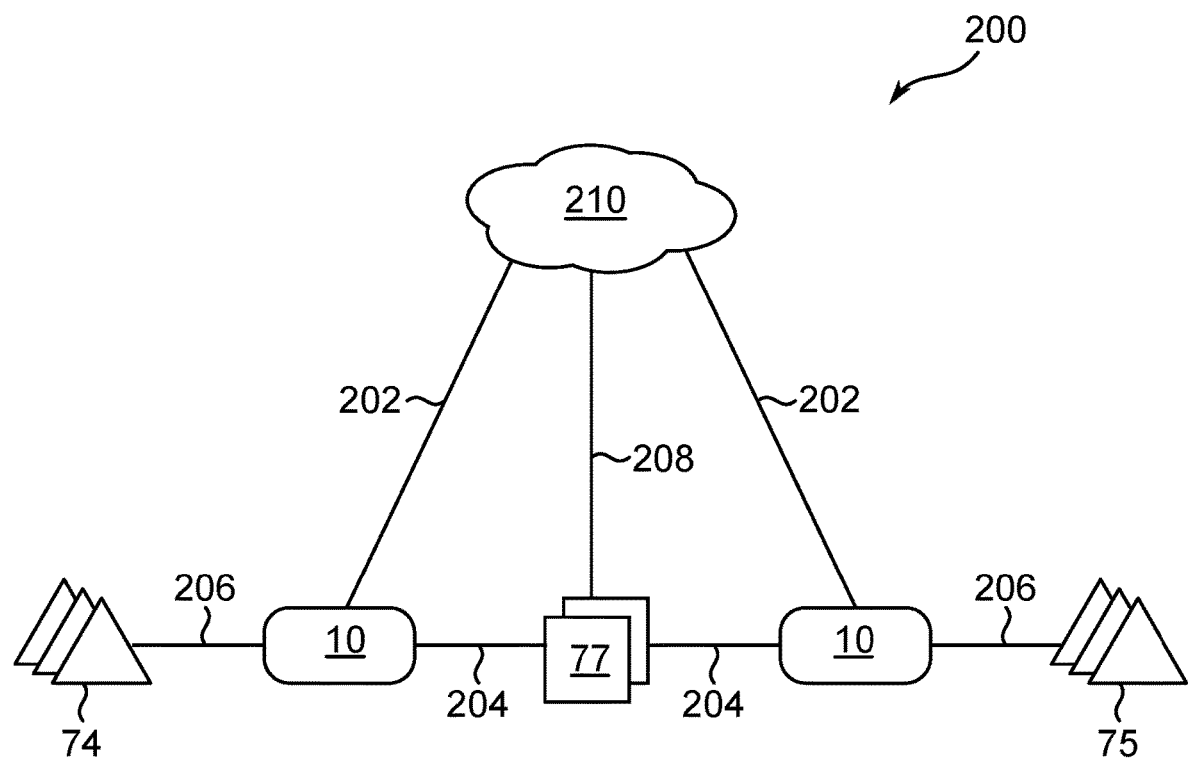
Figure 4:
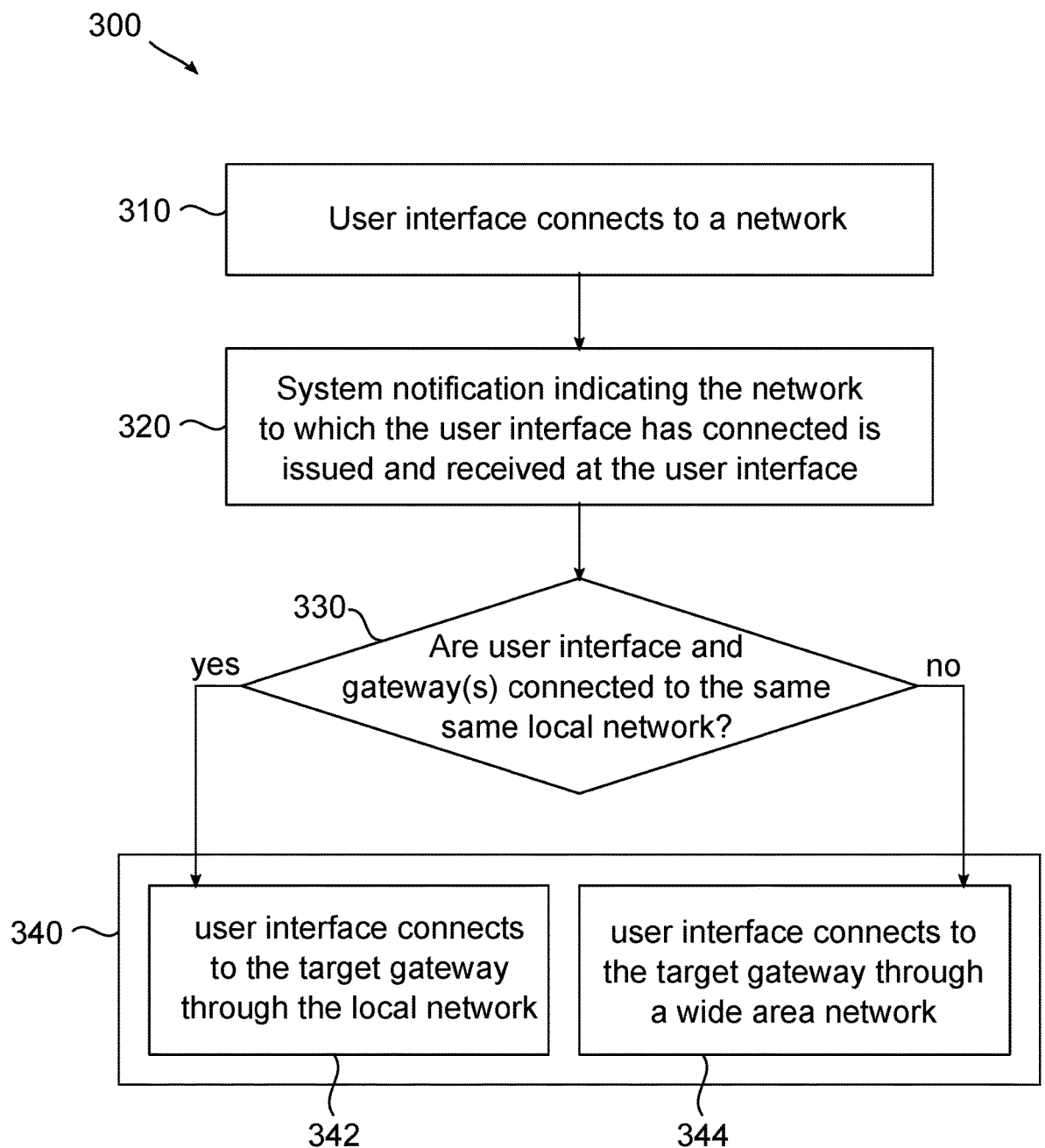

Various other objects, features and advantages of the invention will be readily apparent according to the following description exemplified by the drawings, which are shown by way of example only, wherein:

FIG. 1 illustrates an embodiment of a gateway that operates in connection with control and communication on a local area network;

FIG. 2 illustrates an embodiment of a network in which embodiments of the present invention may operate;

FIG. 3 illustrates communication paths in an embodiment of the present invention; and FIG. 4 illustrates an embodiment of a method of communication between a user interface and a gateway.

DETAILED DESCRIPTION OF THE INVENTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical radios.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term FIG. 1 illustrates an embodiment of a gateway 10 with which a user interface is to communicate in embodiments of transient network communication. The gateway 10 includes a processor 12 and a wireless network communication device 14, which may be a ZigBee® network communication device. The processor 12 and wireless communication device 14 may be combined in a controller 16, which may be a microcontroller. The gateway 10 may also include a communication adaptor 18, memory 20, a communication adaptor port or connector 22, one or more input devices 24, diagnostic output devices 26, and a clock 38.

The gateway 10 may furthermore facilitate communications across networks including one or more wireless networks 40 and one or more wired networks 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets. Those messages may furthermore be queued in or by the processor 12. The data storage device 36 may not be necessary for operation of the gateway 10 in certain embodiments as data may be stored in memory, for example. Data may also be stored remotely and accessed over a network, such as the Internet.

The communication adaptor 18 permits communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

FIG. 2 illustrates a network 70 in an embodiment of the present invention. The network 70 includes a gateway, such as the gateway 10 illustrated in FIG. 1, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter one or more queues, such as a broadcast queue for messages to be transmitted to all devices on the network, a multicast queue for messages to be transmitted to more than one but not all devices on the network, and a unicast queue for messages to be transmitted to one device on the network. Each queue may be a packet queue where packets making up a message are queued for transmission across the network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72, 74, or 75 or events to be actuated at one or more of the end device receiving nodes 72, 74, or 75 such as turning a light on or off, energizing a motor on a motorized window shade or blind, controlling lighting brightness, or controlling lighting color.

FIG. 3 illustrates an embodiment of a network 200 that illustrates communication paths 202, 204, 206, and 208. Communication paths include a gateway to cloud communication path 202 for communication between the gateway 10 and a remote data storage device 210, which may also be referred to herein as the cloud, a gateway to user interface communication path 204 for communication between the gateway 10 and a user interface 77, which may be, for example, a mobile device, a mobile phone, a tablet, a laptop or other form of computer 76, and a gateway to thing communication path 206 for communication between the gateway 10 and nodes 74 and 75 that sense or that control end devices. There may also be a communication path 208 between the user interface 77 and the cloud 202.

FIG. 4 illustrates a method 300 of determining whether a user interface 77 should communicate with a target gateway 10 through a wireless network 40, such as local area network 70 illustrated in FIG. 2 on which the target gateway 10 is communicating or whether the user interface 77 should communicate with the target gateway 10 by way of a wide area network, such as the Internet.

At 310 of the method 300 the user interface 77 connects to a wireless network 40, such as network 70 illustrated in FIG. 2. At 320 of the method 300, a system notification indicating the network to which the user interface 77 has connected is issued and received at the user interface 77. At 330, the user interface 77 determines whether one or more gateways 10, 11 to which a user wishes to connect through the user interface 77 are connected to the network to which the user interface 77 has connected. At 340, the user interface 77 connects to the target gateway 10 through the local network 70 if that gateway 10 is connected to the same local network 70 to which the user interface 77 is connected at 342 and connects to that gateway 10 through a wide area network if that gateway 10 is not connected to the same local network 70 to which the user interface 77 is connected at 344.

At 310 of the method 300 the user interface 77 connects to a network such as the network 70 illustrated in FIG. 2. The user interface 77 may determine whether the user interface 77 is in range of at least one local area network. The user interface 77 may be within range to communicate on a plurality of networks and may select one of those networks to which to connect.

The network to which the user interface 77 connects may be a network selected by the user interface 77 upon bootup or may be a network selected as the user interface is moved from one place to another.

Where the user interface 77 is within range to communicate with a plurality of networks, the network to which the user interface 77 connects may be selected for various reasons. The user interface 77 may, for example, select a network that is broadcasting a strong signal to the user interface 77, indicating that communication with that network will be faster and more reliable than other networks that may be in range of the network communication device 77. The user interface 77 may, alternately, automatically select a network on which a gateway 10 with which the user interface 77 is communicating or is to communicate is connected. In yet another alternate operation, a user may direct the user interface 77 to communicate on a desired network. When the user interface 77 establishes communication through its wireless communication device 14 with a network, a system notification will be received at the user interface 77, notifying the user interface 77 that it has coupled to a network.

At 320 of the method 300, the user interface 77 receives the system notification that it is communicating with a particular network (such as local area network 70 illustrated in FIG. 2) by way of its wireless communication device 14. The user interface 77 will check whether it is communicating on a local area network with one or more target gateways 10, 11 each time the user interface 77 receives a system notification that it is communicating on a new network.

Communication between the user interface 77 and the gateway 10 on the local area network is generally preferable to communication over a wide area network because local area network communication is generally faster than communication over a wide area network.

At 330, the user interface 77 determines whether it is communicating directly on the local area network that includes the target gateway 10. The user interface 77 may make that determination in numerous ways, including polling the network to which it is connected to find the target gateway 10. The user interface 77 may then set a local network flag to on if the user interface is communicating directly with the local area network that includes the target gateway 10 or it may set the local network flag to off if the user interface is not communicating directly with the local area network that includes the target gateway 10. The user interface 77 may store flags or otherwise track the target gateway and may set a flag of otherwise track one or more other target gateways 11. By such methods, the user interface 77 may retain information regarding on which local network one or more gateways 10, 11 are communicating.

The user interface 77 may automatically switch to communicate on a local area network on which a target gateway 10 is communicating to provide fast transmissions and responses in those communications. Thus, the user interface 77 may be able to switch its communication to any of a plurality of local area networks within its range when a user desires to communicate with a gateway 10 on a local area network within the range of the user interface 77. In that way, the user interface 77 may automatically select to communicate directly on a local network on which a target gateway 10 is communicating.

A user may select a target gateway 10 with which that user wishes to communicate through the user interface 77. If the user interface 77 is not communicating on the local network that includes the target gateway 10, but the local network that includes the target gateway 10 is available to the user interface 77, the user interface 77 may redirect its communication to connect to the local network that includes the target gateway 10. For example, in an embodiment, the user interface 77 retains information related to one or more gateways 10 and a local area network on which the gateway 10 communicates. That information may include an association between that gateway 10 and the network on which that gateway 10 communicates.

Thus, when a user of the user interface 77 desires to communicate with a gateway 10 and the user interface 77 has information regarding which local area network that gateway communicates on, the user interface 77 may determine whether that associated network is within its range and, if that associated network is within its range, the user interface 77 may direct its wireless communication adapter 14 to communicate on that network.

The user interface 77 may determine whether it can communicate with the target gateway 10 on the local area network that includes the target gateway 10 in various ways. One way that the user interface may determine whether it can communicate with the target gateway 10 directly on the local area network that includes the target gateway 10 is to poll the target gateway 10 on that network. Alternately, the user interface 77 may search a database held in the user interface 77 or elsewhere accessible to the user interface 77 to determine whether the target gateway 10 communicates on the local area network. Each gateway 10 may, for example, have a unique identifier associated therewith and the target gateway 10 may be identified by that unique identifier in a database or when polled.

If the user interface 77 is not communicating on the local network that includes the target gateway 10, but the local network on which the target gateway 10 communicates is available to the user interface 77, the user of the user interface 77 may redirect the user interface to connect to the local network that includes the target gateway 10. Alternately, the user interface 77 may select the local network on which the target gateway 10 is communicating as the network for the user interface 77 to communicate on.

In one example, the user interface 77 searches the local network to which the user interface 77 is connected for an identifier, such as a UUID or an Internet Protocol address, associated with the gateway 10 with which the user of the user interface 77 wishes to communicate. If the user interface 77 finds the gateway 10 identifier on that network, then the user interface stores in its memory that it is communicating on the same local area network that the target gateway 10 is communicating on and begins communicating with the target gateway 20 directly on that local area network. If the user interface 77 does not find the gateway 10 identifier on that network, then the user interface may store in its memory that it is not communicating on the same local area network that the target gateway 10 is communicating on or simply use a different access path, like the Internet, for communication with the gateway.

The user interface 77 may poll the local area network to which it is connected for the target gateway 10. The user interface 77 may also poll one or more additional local area networks within its connectivity range to determine whether the target gateway 10 is communicating on one of those networks. The user interface 77 may also search networks with which it is in range to communicate for one or more additional gateways 10, 11 with which communication is desired. For example, if an additional gateway 10, 11 was contacted by the user interface 77 within a predetermined period of time, then the user interface 77 may attempt to identify whether a local area network in range of the user interface 77 is a local area network on which that gateway 10, 11 is communicating.

In one embodiment, the user interface processor 12 causes the wireless communication device 14 to communicate on one or more wireless networks 40. The processor 12 identifies whether a desired gateway 10, 11 is communicating on that or those networks 40. The processor 12 may furthermore store in its memory 20 or an associated storage device 36 an association between the desired gateway 10, 11 and its network 40.

The user interface 77 may recognize that it should communicate with the target gateway 10 on the local area network if it is communicating on the same local area network as the target gateway 10 and that the user interface 77 should communicate with the target gateway 10 over a wide area network 42 if it is not communicating on the same local area network as the target gateway 10. In that way, the user interface 77 will not repeatedly attempt to communicate with the target gateway 10 on its local area network if the user interface has not acknowledged that the user interface 77 is communicating on the same network as the gateway 10. Rather, the user interface 77 will communicate with the target gateway 10 over a wide area network 42 that has access to the target gateway 10 local area network on which the target gateway is communicating. Thus, the user interface 77 will not attempt communication with the target gateway 10 on its local network, fail to communicate with the target gateway 10, which is not communicating on that local network, reattempt communication with the target gateway 10 on the local network on which the user interface 77 is communicating, and receive repeated failure to communicate messages, before attempting to communicate with the target gateway 10 over a wide area network.

When the user interface 77 comes into range of one or more wireless networks 40 and a user of the user interface 77 requests communication with a particular gateway 10, the user interface may search the available networks 40 to find the wireless network 40 on which that particular gateway 10 is communicating and connect to that wireless network 40. For example, where the user interface 77 has retained in memory 20 or data storage 36 an association for which wireless network 40 the desired gateway is communicating on, the user interface may scan wireless networks in its range and choose to communicate with the wireless network 40 on which the desired or target gateway 10 is communicating.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalent.

What is claimed is:

1. A user interface, comprising:
   a network communication device for communicating with a remote device; and
   a processor coupled to the network communication device, the processor including instructions which, when executed by the processor, cause the processor to:
   receive a system notification of a local area network on which the user interface network communication device is communicating;
   determine whether a target gateway is communicating on the local area network on which the user interface network communication device is communicating;
   if the target gateway is communicating on the local area network, store the association of that gateway and that local area network in a database in memory coupled to the processor;
   search for the target gateway on the associated network when communication with the target gateway is desired by the user interface;
   communicate with the target gateway on the local area network through the network communication device if the target gateway is communicating on the local area network; and
   communicate with the target gateway through a wide area network through the network communication device if the target gateway is not communicating on the local area network on which the user interface network communication device is communicating.

2. The user interface of claim 1, wherein the user interface further includes memory coupled to the processor and the processor further includes instructions which, when executed by the processor, cause the processor to retain information related to the local area network on which the target gateway is communicating.

3. The user interface of claim 2, wherein the retained information includes an identifier associated with the gateway and an identifier of the local area network on which the gateway is communicating.

4. A user interface, comprising:
a network communication device for communicating with a remote device; and
a processor coupled to the network communication device, the processor including instructions which, when executed by the processor, cause the processor to:
determine whether the user interface is in range of a local area network to which a target gateway is coupled when the processor receives a system notification that the network communication device is communicating with a network;
communicate with the target gateway on the local area network through the network communication device if the user interface is in range of that local area network;
if the user interface is communicating with the target gateway on the local area network, store the association of that gateway and that local area network in a database in memory coupled to the processor; and
communicate with the target gateway through a wide area network through the network communication device if the user interface is not in range of that local area network.

5. The user interface of claim 4, wherein the system notification includes identification of the local area network on which the user interface is communicating.

6. The user interface of claim 5, wherein the processor determines whether the target gateway is communicating on the local area network identified by the system notification.

7. The user interface of claim 4, wherein the network is a first network the user interface communicates with when the user interface is energized.

8. The user interface of claim 4, wherein the network is a network the user interface communicates with when the user interface is moved out of range of a first network on which the user interface was previously communicating.

9. The user interface of claim 4, wherein the processor further includes instructions which, when executed by the processor, cause the processor to retain information related to a plurality of gateways for which it has determined a local area network on which each of the plurality of gateways communicates, the information including an associated network on which each of the plurality of gateways communicates.

10. The user interface of claim 9, wherein the processor further includes instructions which, when executed by the processor, cause the processor to communicate on the local area network on which the gateway communicates when that local area network on which the gateway communicates is within the range of the wireless communication adapter of the user interface.

11. The user interface of claim 9, wherein determining whether the user interface is in range of the local area network to which the gateway is coupled includes selecting a local area network on which the gateway is communicating from a plurality of local area networks within the range of the user interface and coupling to the local area network on which the gateway is communicating.

12. The user interface of claim 4, wherein the processor further includes instructions which, when executed by the processor, cause the processor to poll the local area network to which it is connected for the target gateway.

13. The user interface of claim 4, wherein the processor further includes instructions which, when executed by the processor, cause the user interface to communicate on at least one other network within its range if the target gateway is not communicating on the local area network on which the user interface is currently communicating.

14. The user interface of claim 4, wherein determining whether the user interface is in range of a local area network to which a target gateway is coupled includes coupling to a local area network and determining whether the target gateway is communicating on that local area network.

15. A user interface, comprising:
a network communication device for communicating with a remote device; and
a processor coupled to the network communication device, the processor including instructions which, when executed by the processor, cause the processor to:
determine whether the user interface is in range of a local area network to which a target gateway is coupled when the processor receives a system notification that the network communication device is communicating with a network;
communicate with the target gateway on the local area network through the network communication device if the user interface is in range of that local area network;
poll at least one additional local area network within its connectivity range for the target gateway; and
communicate with the target gateway through a wide area network through the network communication device if the user interface is not in range of that local area network.

16. A user interface, comprising:
a network communication device for communicating with a remote device; and
a processor coupled to the network communication device, the processor including instructions which, when executed by the processor, cause the processor to:
determine whether the user interface is in range of a local area network to which a target gateway is coupled when the processor receives a system notification that the network communication device is communicating with a network;
communicate with the target gateway on the local area network through the network communication device if the user interface is in range of that local area network;
poll at least one local area network within its connectivity range to determine whether at least a second gateway is communicating on that network; and
communicate with the target gateway through a wide area network through the network communication device if the user interface is not in range of that local area network.

17. The user interface of claim 16, wherein the user interface includes memory coupled to the processor and wherein the processor further includes instructions which, when executed by the processor, cause the processor to retain in its memory one or more gateways with which the user interface has communicated and an identification of a local area network on which each of those gateways with which it has communicated is communicating.

18. A method of determining whether a user interface should communicate with a target gateway through a local area network or through a wide area network, comprising:
   connecting to a local area network;
   receiving a system notification indicating the network to which the user interface has connected;
   determining whether a gateway with which the user interface is to communicate is connected to the network to which the user interface has connected;
   storing the association of that gateway and that local area network in a database if the gateway is communicating on the local area network; and
   communicating with the gateway through the local network if that gateway is connected to the local area network and communicating with the gateway through a wide area network if the gateway is not connected to the local area network.

19. The method of determining whether a user interface should communicate with a target gateway through a local area network or through a wide area network of claim 18, further comprising retaining information related to the local area network on which each of a plurality of target gateways sought by the user interface are communicating.

* * * * *